US005990938A

United States Patent [19]

Bern

[11] Patent Number: 5,990,938
[45] Date of Patent: Nov. 23, 1999

[54] SHOWCASE SECURITY SYSTEM

[76] Inventor: Brett L. Bern, 1837 Palmer St., North Las Vegas, Nev. 89030

[21] Appl. No.: 08/806,846

[22] Filed: Feb. 26, 1997

Related U.S. Application Data

[60] Provisional application No. 60/013,151, Mar. 11, 1996.

[51] Int. Cl.[6] .......... H04N 7/18

[52] U.S. Cl. .......... 348/152; 348/154; 348/143

[58] Field of Search .......... 348/143, 144, 348/150, 151, 152, 156, 154; 340/566, 520, 572; 312/114

[56] References Cited

U.S. PATENT DOCUMENTS

| | | | |
|---|---|---|---|
| 3,935,380 | 1/1976 | Coutta | 348/143 |
| 4,804,877 | 2/1989 | Harwood | 312/114 |
| 4,866,661 | 9/1989 | De Prins | 364/900 |
| 4,942,464 | 7/1990 | Milatz . | |
| 4,962,369 | 10/1990 | Close | 340/572 |
| 4,982,281 | 1/1991 | Gutierrez | 348/151 |
| 5,027,104 | 6/1991 | Reid . | |
| 5,105,317 | 4/1992 | Sugiyama et al. | 360/71 |
| 5,111,289 | 5/1992 | Lucas et al. . | |
| 5,359,363 | 10/1994 | Kuban et al. | 348/143 |
| 5,382,943 | 1/1995 | Tanaka | 348/145 |
| 5,545,958 | 8/1996 | Kramer | 318/560 |

FOREIGN PATENT DOCUMENTS

| | | |
|---|---|---|
| 58-215883 | 12/1983 | Japan . |
| 59-104887 | 6/1984 | Japan . |

*Primary Examiner*—Anand S. Rao
*Attorney, Agent, or Firm*—Kenehan, Lambertsen & Stein; John C. Lambertsen

[57] ABSTRACT

An apparatus and method for an improved security system employing a video camera and video recorder is disclosed. Recordation of the video signals from the video camera by the video recorder is controlled by activation of a remotely mounted switch that monitors the status of a controlled access area. When an activation switch is placed adjacent an access door to a retail display cabinet, recordation of the video signals depicting that area will occur only when the access door is opened, generating a signal from the door switch as to the status of the access door ("open"). Upon closing the access door, a second signal is generated by the switch, terminating the recording of the video signals. In this manner video signals are only recorded during such time as access restrictions are compromised.

14 Claims, 1 Drawing Sheet

SHOWCASE SECURITY SYSTEM

CROSS-REFERENCE TO RELATED APPLICATION

This application claims the benefit of U.S. Provisional Application No. 60/013,151, filed Mar. 11, 1996.

BACKGROUND OF THE INVENTION

1. Field of the Invention

The present invention relates to a security system, and more particularly, to such a system that utilizes a video camera and recording tape to monitor activities within a specified area(s) of interest.

2. Description of the Prior Art

As of 1995, losses from shoplifting cost retailers and their customers (through higher prices) more than $10 billion a year. The annual cost of combating the shoplifting problem in the United States—the retail loss prevention industry, is estimated at approximately $3 billion a year.

Such losses affect not only the retailers, but customers and the government as well. When their products are stolen, retailers suffer lost sales, reduced profits, inventory depletion, all of which, in many cases, results in stunted or destroyed businesses. Consumers are forced to not only pay the higher prices that reflect the increased cost in doing business, they are also deprived of products that would otherwise be available for purchase. Tax revenues for governments at all levels are lowered, both due to the loss of sales tax revenues, as well as resulting from lowered business earnings. As a result, taxes must be raised for all tax payers to replace this "lost revenue".

Loss prevention experts suggest using increasingly-sophisticated security systems having new technologies as the most effective strategy to fight this growing problem. However, effective deployment of this technology first requires an understanding of the problem: who is doing the stealing, what is being stolen, what theft techniques are being used, and where and when are businesses most vulnerable.

Studies done in an attempt to answer such questions have demonstrated that more than one-half of all thefts are perpetrated by employees. In one study of 400 retail chains, the breakdown of all reported shoplifting thefts revealed that approximately 42% of the thefts were committed by the businesses' own employees, with 32% by customers, a small fraction by vendors, and the rest a result of unintentional employee or system errors.

Two of the major technology-driven methodologies used to combat customer and employee theft are electronic article surveillance and asset security. The first method, electronic article surveillance ("EAS") essentially involves product tags and cameras. The tags, unless deactivated, set off alarms located at points of egress. Close circuit television cameras ("CCTV") are used to record anything that is happening, and is a critical companion technology to electronic tagging. Cameras enable retailers to observe shoplifting in "real time," record audio/visual evidence for later prosecution—including times and dates, monitor dead zones in stores, permit later observation and study of new shoplifting techniques, and enable the tracking of suspected repeat offenders.

The asset security methodology makes use of security personnel and material barriers to guard and screen access to the product. Such procedures are seen as being the least desirable for a retail business, as creating a less-than optimal sales environment. Coats attached to hangers with cable, products behind glass counters, etc., tend to discourage customers from trying out the product, which in turn lowers the likelihood of making a sale.

While seen as less than desirable from a retail perspective, systems such as card readers can be very effective in controlling shrinkage involving employees and vendors. Asset security technology directed towards employee theft also lends itself to integration with information received from camera systems, point of sale stations, and sales/inventory reports.

Such security efforts are in recognition that the problem posed by employee theft has proven to be most difficult to combat. Employees are likely aware of the defenses erected by their employer to prevent shoplifting, and are thereby able to circumvent such procedures. In addition, while the public may gain access to the merchandise areas for only limited hours of the day, cleaning crews and merchandise re-stockers are accorded access at times when very little supervisory personnel are on the premises.

Cameras can be particularly effective against dishonest employees who are aware of and have been trained regarding anti-shoplifting measures. Knowing the cameras are present tends to increase the perception that the risk of getting caught is increased. It is hoped that such knowledge will act as a deterrent, and thereby modify the behavior of any employee having thoughts of committing such a theft.

Cameras, however, can only be useful to a security program if there are persons watching the monitors. The 24-hour, cash-rich environment of gaming casinos almost requires the saturation of the premises with video cameras, and 24-hour monitoring of their output. However, the majority of business establishments cannot justify the personnel costs required to staff a bank of video monitors. To be effective, such staffing would have to include the times when the facility is open to the public, as well as during those periods of employee access only. The use of video recorders to record the camera output is not particularly helpful, since the recordings themselves must be watched at some point if thefts are to be discovered—also a 24-hour labor requirement.

SUMMARY OF THE INVENTION

In accordance with the present invention, a security system is provided that provides "on demand" video camera monitoring of preselected areas of interest. An activation mechanism is in communication with a video camera and recorder. The activation mechanism is selected such that an activation signal is generated upon the occurrence of an event, and where video monitoring of that event is desired. Upon receiving the activation signal, the recorder is activated, and all video signals are thereafter recorded, permitting their later viewing if no personnel are present to monitor the camera at the time.

The present invention thus provides a security system that is available on a 24-hour basis, but does not require 24-hour monitoring effort by security personnel. For example, if valuable merchandise is located within a locked display case, the activation mechanism can be a door switch that sends a signal to the video recorder upon the opening of the display case door. So long as the display case door is open, the camera signals will be recorded for later viewing. Since thefts can occur only during the time that there is access to the interior of the display case, video monitoring will be effectively available at all times when the display case door is open, and no monitoring will be required during the majority of time when the door is closed.

The present invention adds considerable flexibility to present camera security systems, with new applications limited only by the system designer's ingenuity in selecting the activating mechanisms. In addition to door switches, such mechanisms could easily also include proximity and motion detectors, card readers, invisible product tags, acoustic detectors, time clocks.

In addition to its use in systems where no security personnel are available to monitor the video signals, the present inventive security system can also be used where security personnel are engaged in such monitoring. In such systems, the activating mechanism generates an indicator signal that is designed to alert the security personnel and thereby direct attention to the video signals at those times most likely to be meaningful in terms of theft prevention and detection.

The above and other objects, features, and advantages of the present invention shall become apparent from the following description, taken in conjunction with the accompanying drawings.

DETAILED DESCRIPTION OF THE PREFERRED EMBODIMENTS

Figure 1:
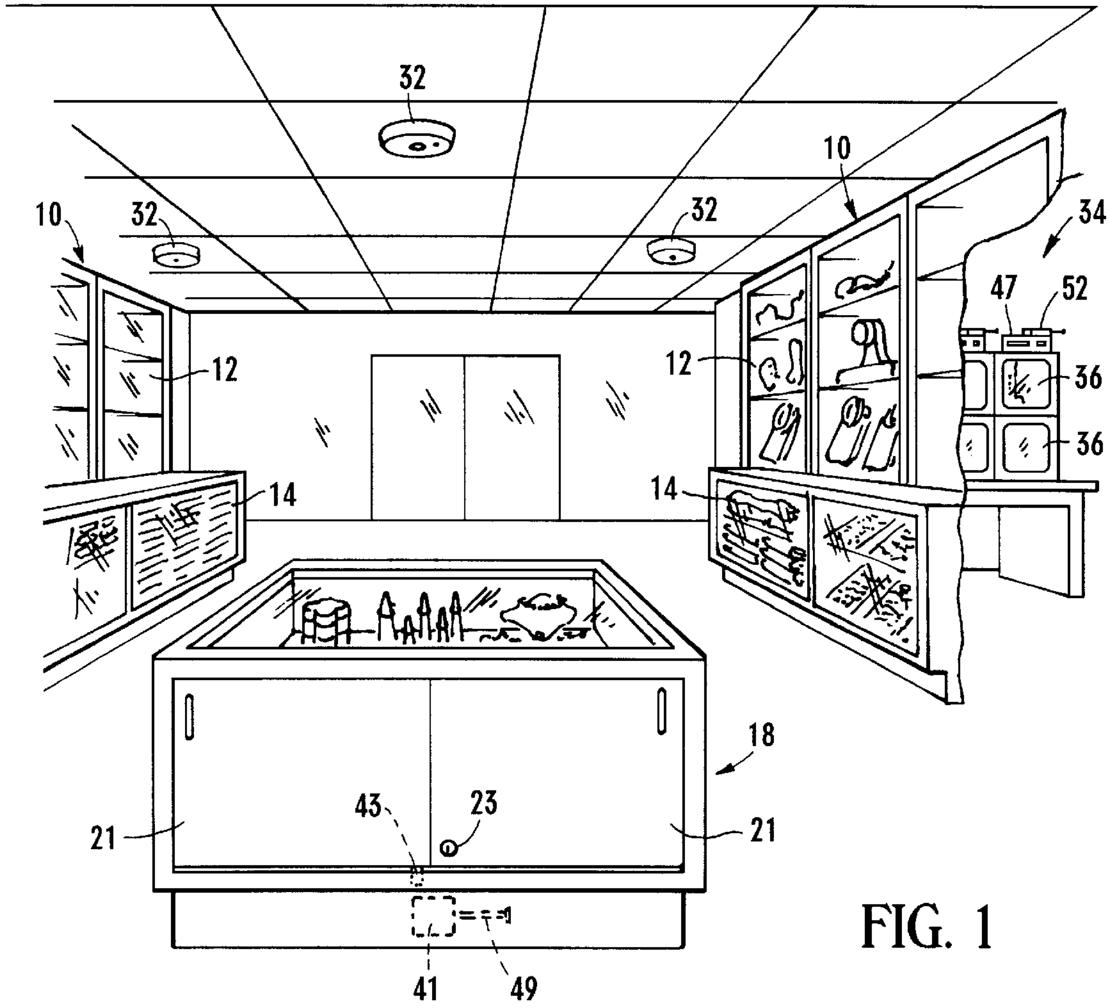
FIG. 1 is a perspective view, with portions broken away and portions in phantom, showing an exemplary retail establishment having a security system installed in accordance with the present invention.

Reference is now made to the drawings wherein like numerals refer to like parts throughout. Referring to FIG. 1, a generically-depicted retail establishment is shown having various types of merchandise on display. A pair of wall casings 10 are shown on opposing walls, and consist of an upper display 12 and a lower cabinet 14. Merchandise is also visible from within a floor display cabinet 18 that is provided with a pair of access doors 21. A cabinet lock 23 is provided to secure the access doors 21 and accord limited access to the interior portions of the floor display cabinet 18. In FIG. 1, such merchandise is depicted as consisting of various cosmetics, watches, and jewelry; however, such display cabinets can also contain other merchandise of "concentrated" or "enhanced" value.

The retail establishment depicted in FIG. 1 has addressed the shoplifting problem in part by installing a video security system. A plurality of security cameras 32 are shown distributed throughout the sales areas of the store. The video signals generated by the security cameras 32 are transmitted, typically through a hard-wired system (not shown) to a security station 34 that typically includes a plurality of video monitors 36.

The video cameras 32 are traditionally left on and transmit images of all that passes within their range or field of vision. This then requires that if any criminal acts are to be detected, a person or persons (not shown) must remain in position at this security station 34, continually viewing the video monitors 36.

In accordance with the present invention, the floor display cabinet 18 is provided with an activation switch 41. A door sensor 43 is in electrical communication with the activation switch 41 and is reactive to the position of the access doors 21. In the preferred embodiment, upon sensing that the access doors 21 have been opened, a signal is generated by the door sensor 43, causing an activation signal to be generated by the activation switch 41. This generated signal is then communicated to a video recorder 47.

While such signal can be communicated via a hard wire network (not shown) a preferred communication method is via a transmitted signal, wherein the activation switch 41 is provided with an antenna 49. A receiver 52 is in electrical communication with the video recorder 47, and upon receipt of an activation signal from the activation switch 41, the receiver 52 initiates a signal that regulates the on/off operation of the video recorder 47.

By way of example and not of limitation, the opening of one or both access doors 21 of the floor display cabinet 18 results in activation of the door sensor 43, causing the activation switch 41 to generate a signal, that in turn is transmitted to the receiver 52. Upon receiving the signal, the video recorder 47 begins recording a video signal from the security camera 32 that "covers" the floor display cabinet 18. In this manner, all activity being conducted at and around the floor display cabinet 18 will be recorded for the entire time the access door 21 is open.

Upon the closing of the access door 21 the door sensor 43 is activated, causing a second signal to be generated by the activation switch 41 and communicated, via the receiver 52, to the video recorder 47. Upon receipt of such a signal, the video recorder 47 ceases recording the signal from the security camera 32.

Using this system, the videotape now only includes actions recorded at such times as the interior portions of the floor display cabinet 18 are vulnerable. Such selective recording considerably enhances the efficiencies of the security system. No longer must security personnel view a series of monitors that transmit, in mind-numbing detail, the lack of any activity for hour after hour. Such sameness can only invite the security personnel to miss those proportionally brief instances where merchandise is actually vulnerable to theft. Instead, using the system of the present invention, the tape will provide a complete record of all such times when access to the merchandise is available, and vulnerability to theft is at its highest.

Figure 2:
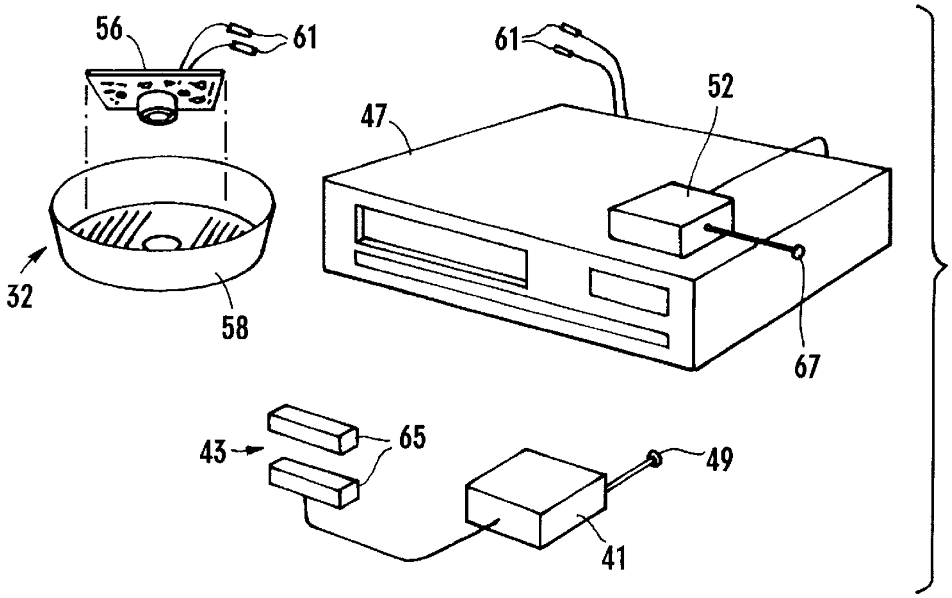
FIG. 2 is a perspective view, partially exploded, showing the individual elements of a security system in accordance with the present invention.

Turning now to FIG. 2, the three primary components of the present invention are shown in greater detail, namely, the security camera 32, the activation switch 41, and the video recorder 47. The miniaturization in technology that has been made possible through the increasing complexity and "density" of electronic devices has permitted the considerable miniaturization of video cameras. FIG. 2 illustrates the use of a video board camera 56 that is shown fitting behind a false cover 58, which is configured to resemble a smoke detector. A variety of video board cameras are now available—one such camera manufactured by COMPUTAR has outer dimensions of approximately 1½ inches wide, 3 inches long, and 1¼ inches in depth (Chugai Boyeki (America) Corp, California office, Torrance, Calif.). GBC (exclusive distributor, CCTV Corporation, Hackensack, N.J.) also provides a number of different camera models, and offers placement in a variety of different surveillance platforms, including a false clock, a false speaker, a mounted picture, a false exit sign, and one placed in an emergency light unit.

The signals generated by the video camera are preferably transmitted to a video recorder and then onto a video monitor. This transmission is typically by a hard-wire system, although the technology is also available to transmit these signals using a radio frequency transmission (see, for example, the wireless camera system offered by Wireless Technologies of Las Vegas, Nev.). Except for unusual installations, present technology makes the radio transmission method considerably more expensive than connecting the camera to the recorder and monitors using a harness of conventional electrical wiring 61.

Turning now to the activation switch 41, FIG. 2 illustrates the door sensor 43 as a magnetic switch 65. Comprising two separate housings, a typical installation has a first housing placed on a peripheral portion of the moveable structure. The second housing is placed at a location on the stationary structure that lies immediately adjacent the first housing when the moveable structure is in a closed position. A magnet is placed in the first housing, and when in proximity to the second housing, causes an electrical switch within the second housing to be in a first position. Upon movement of the moveable structure, the first housing moves from its position in close proximity to the second housing, and likewise removing the magnetic field. This change in the magnetic field density in turn causes activation of the switch in the second housing.

The magnetic switch 65 illustrated in FIG. 2 is of a conventional surface-mount switch, such as that sold by Sentrol, Inc. For certain locations surface mounting is not practical, and magnetic switches are also available for recessed mounting, such as the 1065 and 1072 series by Sentrol. Suitable transmitter-receiver systems for use in sending a signal from the switch to the video recorder are available from a variety of manufacturers, including Linear Corporation, a Nortek Company, Carlsbad, Calif.

It is to be understood and appreciated that other types of switching and signaling devices are also contemplated by the present invention. For example, particularly with respect to hinged doors, recessed roller plunger switches can be particularly useful. Mounted in the door jamb, a central plunger is biased to project outwardly from the switch. Upon closing the door, the plunger is pushed back into the switch, with activation dependent upon the position of the plunger. An example of such a switch is any one of the 3000 series of switches offered by Sentrol, Inc.

The present invention also can be used with other secured areas besides showroom display cabinets. Any "secured" area that limits access by using a door or like movable structure can be equipped with a switch that signals a change in the access door open/close status. For example, cash register drawers become vulnerable to theft only when they are "open", and a switch can signal each time a drawer opens, with the video recorder energized while the drawer is open. Enclosed storage rooms could likewise employ a signal adjacent the access door, to turn on the video recording system at any time the door is opened—or, using a proximity detector, at any time the area in front of the door is "disturbed". Additionally, since the switch and activation signal are portable, requiring only access to an electrical power supply, it can be deployed in a variety of locations in homes and businesses, and in automobiles and commercial vehicles.

The third primary component of the present invention is the video recorder 47. As noted previously, it is preferably activated by a radio-transmitted signal to the receiver 52 having a receiver antenna 67. The video recorder 47 is of a conventional type similar to those in use for home television recordings.

My invention has been disclosed in terms of a preferred embodiment thereof, which provides an improved showcase security system of great novelty and utility. Various changes, modifications, and alterations in the teachings of the present invention may be contemplated by those skilled in the art without departing from the intended spirit and scope thereof. It is intended that the present invention encompass such changes and modifications.

I claim:

1. A portable security system for a commercial establishment comprising:

a covert video camera placed in such a manner that at least a portion of the premises of said commercial establishment is viewed by said camera;

a portable video recorder in wireless communication with said camera such that video signals generated by said video camera are received by said video recorder; and a premises activation mechanism in wireless communication with and controlling the recording operation of said portable video recorder, such that upon activation, said premises activation mechanism generates one or more control signals that when communicated by a radio frequency transmission to said video recorder initiate or terminate the recording by said video recorder of said video signals generated by said covert video camera.

2. An improved security system as described in claim 1, wherein said portable video recorder is remotely located from said covert video camera.

3. An improved security system as described in claim 2, wherein said video recorder is located within a security station.

4. An improved security system as described in claim 1, wherein said premises activation mechanism comprises an activation switch that monitors the position of an access door to an area within said commercial establishment offering restricted access.

5. An improved security system as described in claim 4, wherein said area offering restricted access is a floor display cabinet.

6. A portable security system for a commercial establishment comprising:

a covert video camera placed in such a manner that at least a portion of the premises of said commercial establishment is viewed by said camera;

a portable video recorder in wireless communication with said camera such that video signals generated by said video camera are received by said video recorder; and a premises activation mechanism in wireless communication with and controlling the recording operation of said portable video recorder, said premises activation mechanism comprising an activation switch that monitors the position of an access door to an area within said commercial establishment offering restricted access, said area comprising a floor display cabinet, such that upon activation, said premises activation mechanism generates one or more control signals that when communicated by a radio frequency transmission to said video recorder initiate or terminate the recording by said video recorder of said video signals generated by said covert video camera, wherein said activation switch comprises a mechanical switch.

7. A portable security system for a commercial establishment comprising:

a covert video camera placed in such a manner that at least a portion of the premises of said commercial establishment is viewed by said camera;

a portable video recorder in wireless communication with said camera such that video signals generated by said video camera are received by said video recorder; and a premises activation mechanism in wireless communication with and controlling the recording operation of said portable video recorder, said premises activation mechanism comprising and activation switch that monitors the position of an access door to an area within said commercial establishment offering restricted access, said area comprising a floor display cabinet, such that upon activation, said premises activation mechanism generates one or more control signals that when communicated by a radio frequency transmission to said video recorder initiate or terminate the recording by said video recorder of said video signals generated by said covert video camera, wherein said activation switch comprises a magnetic switch.

8. An improved security system as described in claim 1, wherein said portable video recorder is remotely located from said premises activation mechanism.

9. A portable, covert security system product for areas of restricted access comprising in component parts:

a miniaturized, electronic video camera covertly monitoring an area of restricted access;

a portable video recorder in wireless communication with and receiving video signals from said video camera; and a control switch remotely located from and in wireless communication with said video recorder in a manner that initiates and terminates the recording of said video signals from said miniaturized, electronic video camera.

10. A portable, covert security system product as described in claim 9, wherein said area of restricted access comprises a specified floor space in a retail business establishment, and wherein said control switch comprises a motion detector.

11. A portable, covert security system product as described in claim 9, wherein said area of restricted access comprises a floor display cabinet located within a retail business establishment, and wherein said control switch comprises an access door activation switch.

12. A portable, covert security system product for areas of restricted access comprising in component parts:

a miniaturized, electronic video camera covertly monitoring an area of restricted access;

a portable video recorder in wireless communication with and receiving video signals from said video camera; and a control switch remotely located from and in wireless communication with said video recorder in a manner that initiates and terminates the recording of said video signals from said miniaturized, electronic video camera, wherein said area of restricted access comprises a floor display cabinet located within a retail business establishment, and wherein said control switch comprises an access door activation switch, and wherein said access door activation switch is a magnetic switch.

13. A portable, covert security system product as described in claim 9, wherein said area of restricted access comprises a cash drawer, and wherein said control switch comprises a position sensor activated upon placement of said cash drawer in a pre-determined position of enhanced access thereto.

14. An improved method for video monitoring of private or commercial space comprising:

installing on a temporary basis and in a covert manner a miniaturized, electronic video camera in a location that permits said video camera to secretly view a desired location and provide a video output signal relating to said desired location;

communicating by radio frequency transmission said video output signal to a portable video recorder on a substantially continuous basis;

controlling the recordation of said video output on a recording medium within said video recorder based upon a set of pre-determined parameters received by a radio frequency transmission and relating to an activation state at said desired location.

* * * * *